Sept. 6, 1932.  W. R. MORRIS  1,876,070
WATER MOTOR
Filed March 9, 1928   3 Sheets-Sheet 1
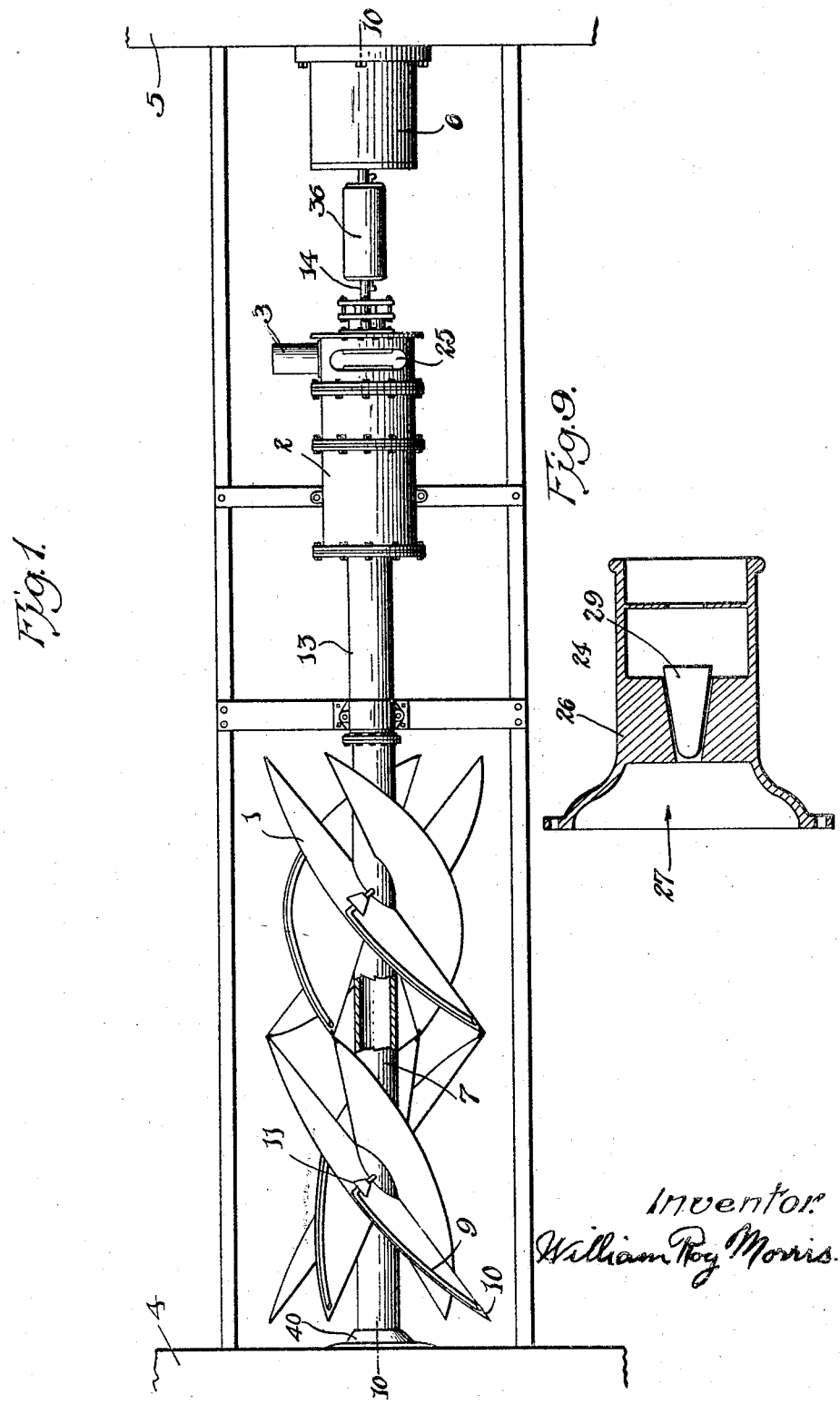

Sept. 6, 1932.  W. R. MORRIS  1,876,070
WATER MOTOR
Filed March 9, 1928  3 Sheets-Sheet 2
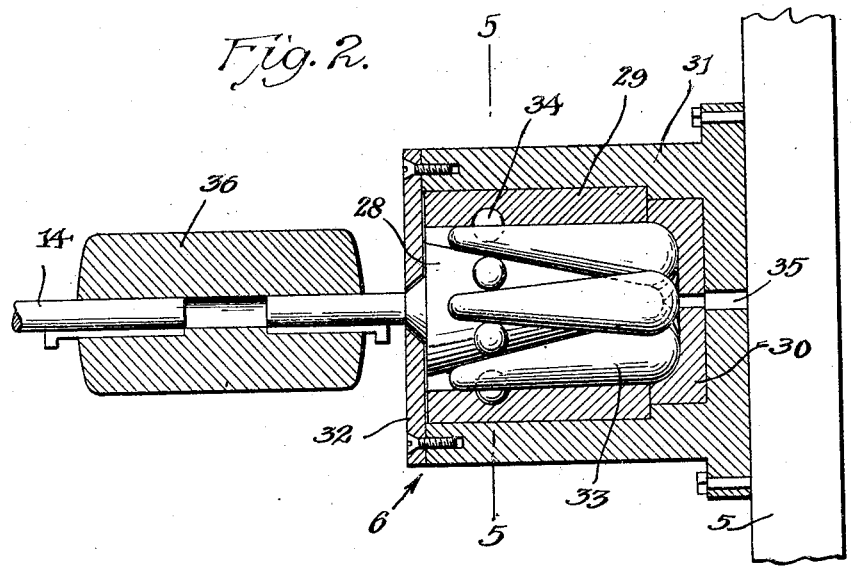
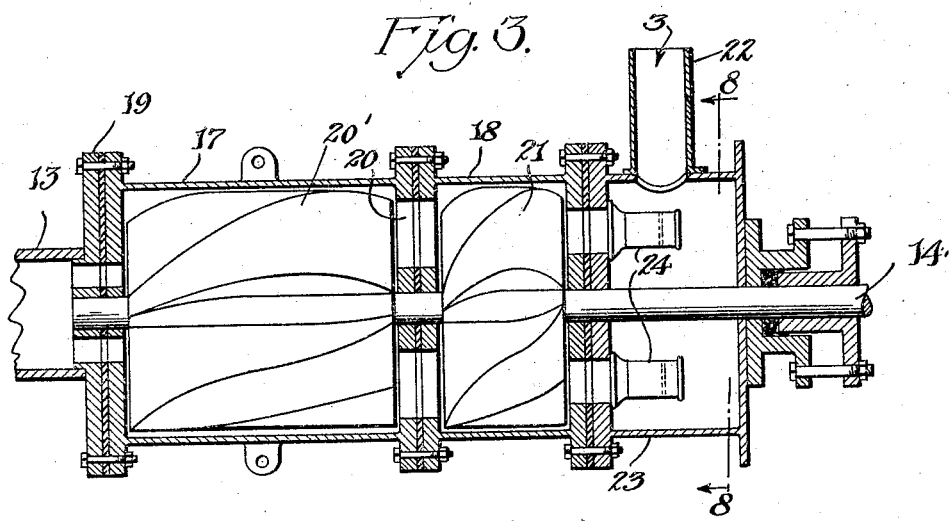
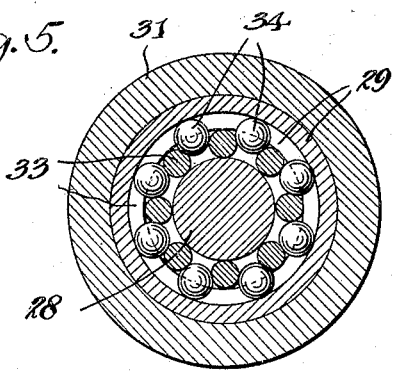
Inventor
William Roy Morris

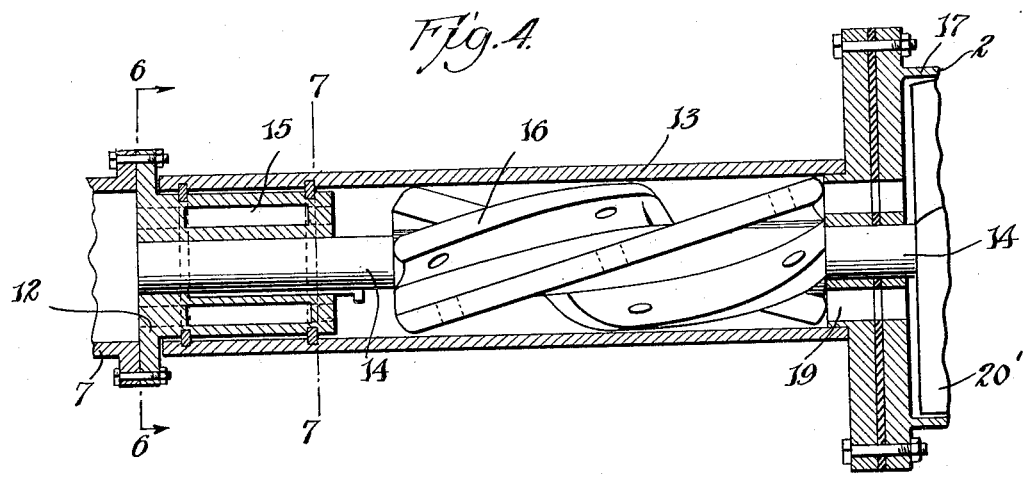
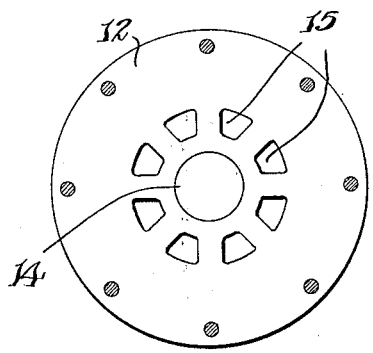
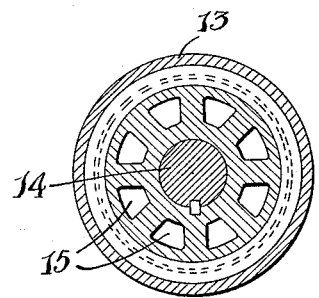
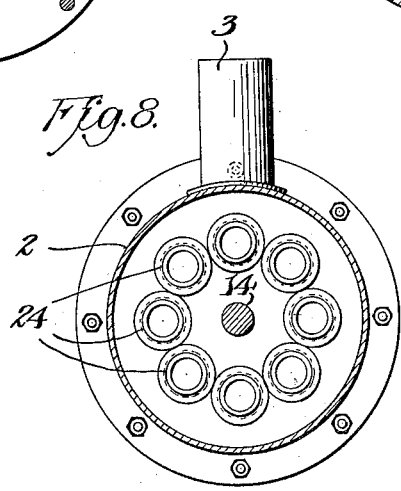

Patented Sept. 6, 1932

1,876,070

UNITED STATES PATENT OFFICE

WILLIAM ROY MORRIS, OF TWIN FALLS, IDAHO

WATER MOTOR

Application filed March 9, 1928. Serial No. 260,503.

This invention relates to a combined motor and pump, and proposes a construction in which the torque of the pumping elements overcomes to a greater or less extent the end thrust produced by the pressure of the flowing water against the motor impeller.

Another object of the invention is to provide an apparatus of the class described in which the motor impeller induces, directly by its motion, a flow of water to the pump, the pressure being built up in the latter element to the desired delivery pressure.

Another object of the invention is the provision of a novel construction of impeller blades which enhances the efficiency of the apparatus as well as providing a construction of maximum durability.

A further object of the invention is the provision of novel end thrust bearing particularly adapted to immersion in water.

Other objects of the invention will become apparent as the following description of a preferred and practical embodiment thereof proceeds.

In the drawings in which the same characters of reference are used in the several figures to denote identical parts:

Figure 1 is a front elevation of apparatus embodying the principle of my invention;

Figure 2 is a longitudinal section through the end thrust bearing;

Figure 3 is a longitudinal section through the pump cylinder;

Figure 4 is a longitudinal section through that part of the apparatus intermediate the impeller and pump cylinder showing the spiral conveyor;

Figure 5 is a section taken along the line 5—5 of Figure 2;

Figure 6 is a section taken along the line 6—6 of Figure 4;

Figure 7 is a section taken along the line 7—7 of Figure 4;

Figure 8 is a section taken along the line 8—8 of Figure 3 viewed in the direction of the arrows;

Figure 9 is a longitudinal section showing a modified support for the impeller end of the apparatus in which a check valve may be provided for admitting water to the hollow impeller shaft.

Before referring in detail to the several figures, it may be stated that this apparatus is adapted to be placed either horizontally as in a flowing stream or vertically as beneath a water fall or other head of descending water, and while it is preferred to encase the impeller portion of the device, yet the same may be left open and in the present illustration, for clarity, the casing of the impeller has been omitted.

The apparatus as shown in Figure 1 consists essentially of the motor impeller 1 and the pump 2 driven by the impeller, said pump as here shown being of the multi-stage rotary impeller type in which the water is raised to a greater pressure successively in communicating chambers having impellers of different pitch and from which it is delivered by means of the pipe 3. The apparatus is shown as supported between suitable abutments 4 and 5.

It is assumed that water enters the impeller at the end nearest the lower edge of the sheet of drawings, so that viewed from the lower end the impeller rotates in a clock-wise direction. This creates an end thrust which exceeds the counter-thrust of the pump and a suitable end thrust bearing 6 is provided, at the upper end of the shaft to withstand different thrusts, the construction of which bearing is shown in detail in Figure 2 and which will be presently explained.

Referring to Figure 1, it will be observed that the impeller shaft 7 is hollow, the same serving as a conduit for water which is supplied directly to the low pressure chamber 17 of the pump. The impeller preferably acts as a direct means for inducing a flow of water to the pump. This it does by means of scoops 9 in the form of tubes mounted on the sides of the impeller blades opposite the sides engaged by the flowing water, and having open mouths 10 at their advance ends which pick up water through inertia during the rotation of the impeller and deliver the water to the hollow shaft 7 with which said scoops communicate.

The scoops are preferably provided with check valves 11 for retaining water in the shaft 7 so that in the event the pump cylinder being above the surface of the water, a column of water will stand in it at all times and it will not need priming. The hollow impeller shaft 7 is made fast to a hub 12 which freely revolves in the adjacent end of the casing of the pump cylinder 2. Said hub is formed with a central bore for receiving the solid pump shaft 14, the latter being keyed to said hub. The hub is further provided with longitudinal bores 15 which communicate with the conveyor chamber of the pump cylinder. Said conveyor chamber as shown in Figure 4, encloses a spiral conveyor 16 which advances the water to the pump impeller.

The pump proper which is shown in detail in Figure 3 comprises a pair of cylindrical fittings 17 and 18 secured together preferably in known and usual manner by flanged connections 19. The low pressure cylinder is constituted by the fitting 17 which is of larger capacity and which communicates with the chamber of the conveyor by means of apertures 19. Within the low pressure chamber and suitably secured to the shaft 14 is a series of vanes 20', by means of which the first stage of pressure is imparted to the water, forcing it through the apertures 20 into the high pressure chamber.

This chamber which is constituted by the space within the fitting 18 is smaller than the low pressure chamber and contains the series of vanes 21 by means of which the pressure of the water is raised, the water being delivered through a suitable outlet 22 connected to the extension 23 of the pump cylinder and which is separated from the high pressure chamber by check valves 24.

Figure 1 shows an opening 25 in the extension 23 by means of which access may be had to the check valves for clearing the same and which opening is designed to be normally closed by a suitable cover, not shown.

One of the important features of the invention is that the vanes 20' and 21 in the low and high pressure of the pump respectively, are directed oppositely to the impeller blades so that the end thrust which they impart to the shaft of the apparatus is opposed to the end thrust of the impeller and consequently reduces the end thrust of the latter, increasing the efficiency of the apparatus to that extent. Furthermore, by picking up the water to be supplied to the pump through the inertia action of the scoops 10, the vanes in the pump cylinders are relieved from sucking the water clear from the bottom of the hollow shaft 7 so that their entire energy may be devoted to imparting pressure to the outflowing water.

Figure 9 shows a support 26 which, if desired may be substituted for the chamber support 40 shown at the lower end of the apparatus in Figure 1. This support is spaced from its anchorage as shown at 27 and provided with an aperture controlled by a check valve 29 whereby, if desired a portion of the water to be supplied to the pump may be admitted in this manner. It is to be understood that suction of the vanes is not depended upon to draw in the water, but the velocity of the flow in the hollow shaft induced by the water picked up by the scoops.

Figure 2 shows the novel end thrust bearing 6 comprising a conical central element 28 seating in a chamber formed by a cylindrical bushing 29 and a lower cup-shaped bushing 30. Said bushings are retained in the fitting 31, which is suitably supported, and closed by a removable cover 32, by the removal of which access can be had to the bearing. Arranged peripherally within the chamber formed by said bushings are a plurality of tapered rollers 33 having hemispherical ends, the large ends seating in the cup-shaped bushing 30, and said ends being of such size as to substantially touch one another.

The taper of said rollers corresponds to the conicity of the central member 28 so that the conical elements of the latter member lie parallel and in continuous contact with the elements of the tapered rollers. Spaces are thus formed between the smaller ends of the rollers and an intermediate portion of the conical central member, in which space balls 34 are arranged and retained. The expanding portions of the tapered rollers prevent the balls from moving downward while the expanded base of the central member prevent the balls from moving upward, consequently without any other mechanical construction being provided, the balls are retained in a definite path just as though they were restrained in a channeled ball race. This bearing has the advantage that there are no crevices, cracks or corners into which sediment can collect and remain with the result of grinding away the bearing elements. Even though this bearing be submerged, the construction is such that there are open spaces between each of the bearing elements through which grit may be quickly washed or gravitate and the bearing is provided with an open passage 35 in its lower-most portion through which such grit and sediment may be discharged.

The end thrust bearing is shown connected to the solid shaft of the apparatus by a common keyed coupling 36.

In order to obtain highest efficiency in the operation of my combined current motor and pump, the impeller is constructed with blades formed as sectors which over-lap. Thus, in a given length of impeller, a greater number of blades are provided, while the overlapping relation of the blades strengthens the impeller since the blades form braces between the central shaft and the casing which normally is provided to enclose the impeller. In Figure 1 there are two stages of blades, said blades being sector-shaped and connected at their adjacent ends. On account of their substantial discontinuity, each blade can be made of varying pitch from the advance edge, that is from the edge at which the water enters, to the edge at which the water leaves and thus the effect of a compound turbine is produced.

Although the drawings show four blades in each stage arranged circumferentially of the impeller shaft, it is to be understood that the number of blades is not to be restricted, but that any number of blades desired may be used.

While I have in the above description endeavored to describe what I believe to be a practical embodiment of my invention, it is to be understood that the structural details are merely by way of example and not limitative in their bearing on the scope of the invention as claimed.

What I claim is:

1. A combined hydraulic motor and pump comprising an impeller and a pump, a hollow shaft for transmitting power from said impeller to said pump, and supplying water to said pump, said impeller and pump being so correlatively positioned that the end thrust of the pump opposes the end thrust of the said impeller on said shaft, said impeller including blades, and scoops associated with said blades and communicating with said hollow shaft for forcibly introducing water into said shaft.

2. A combined hydraulic motor and pump comprising an impeller and a pump, a hollow shaft for transmitting power from said impeller to said pump, and supplying water to said pump, said impeller and pump being each provided with vanes, the vanes being so relatively inclined that the end thrust of said pump opposes the end thrust of said impeller on said shaft, scoops associated with the vanes of said impeller and communicating with said hollow shaft for forcibly introducing water into the same, and check valves in said scoops for maintaining a water column in said hollow shaft when said impeller is stationary.

3. A combined hydraulic motor and pump comprising a bladed impeller, and a pump having a bladed piston, a common shaft on which the blades of said impeller and pump are fixed, that portion of the shaft carrying said impeller blades being hollow and communicating with said pump, a conveyor on said shaft intermediate said pump and impeller, a casing surrounding said conveyor and forming a conduit in communication with said hollow portion of said shaft and with said pump, means on said impeller blades for forcibly introducing water into said hollow shaft, the blades of said pump and impeller being oppositely inclined so that the end thrust of said pump opposes the end thrust of said impeller on said shaft.

4. A combined hydraulic motor and pump comprising a bladed impeller, and a pump having a bladed piston, a common shaft on which the blades of said pump and piston are mounted, that portion of said shaft carrying said impeller blades being hollow and communicating with said pump, the latter comprising cylindrical fittings forming communicating chambers and the blades of said pump being arranged in two series in said chambers for imparting stage pressure to the water, means on said impeller blades for forcing water into the hollow portion of said shaft and to said pump, and a valved outlet for said pump communicating with the high pressure chamber having valves closing against the return of water from said outlet to said chamber.

5. A combined hydraulic motor and pump comprising a motor impeller and a multistage pump having high and low compression chambers with impellers of different pitch in said respective chambers, a shaft for transmitting power from said motor impeller to said pump impeller, said shaft being hollow from said motor impeller as far as the low pressure pump chamber, communicating therewith, said hollow shaft being open to a water supply substantially in the zone of said impeller.

6. A combined hydraulic motor and pump comprising a motor impeller and a multistage pump having high and low compression chambers with impellers of different pitch in said respective chambers, a shaft coaxial with said motor and pump impellers and connected direct thereto for transmitting power to said pump, said shaft being hollow from said motor impeller as far as the low pressure pump chamber, and communicating therewith.

7. A combined hydraulic motor and pump comprising a motor impeller and a multistage pump having high and low compression chambers with impellers of different pitch in said respective chambers, a shaft coaxial with said motor and pump impellers and connected direct thereto for transmitting power to said pump, said shaft being hollow from said motor impeller as far as the low pressure pump chamber, communicating therewith, said motor and pump impellers being so co-relatively inclined that the end thrust of the pump opposes the end thrust of the motor impeller on said shaft.

Signed and sworn to this 2nd day of January, 1928, at Twin Falls, Idaho.

WILLIAM ROY MORRIS.